(12) United States Patent
Chase

(10) Patent No.: US 6,366,547 B1
(45) Date of Patent: Apr. 2, 2002

(54) ULTRA HIGH DENSITY DISK READER/WRITER COMPRISING TWO INTERFEROMETERS

(76) Inventor: Roland H. Chase, 6902 Presley Rd., Lanham, MD (US) 20706

(*) Notice: Subject to any disclaimer, the term of this patent is extended or adjusted under 35 U.S.C. 154(b) by 0 days.

(21) Appl. No.: 09/627,076

(22) Filed: Jul. 27, 2000

Related U.S. Application Data

(63) Continuation-in-part of application No. 09/035,824, filed on Mar. 6, 1998, now Pat. No. 6,269,066.

(51) Int. Cl.⁷ .................................................. G11B 7/00
(52) U.S. Cl. ................. 369/112.01; 369/103; 369/126; 369/44.23; 369/44.37
(58) Field of Search ........................ 369/112.23, 112.01, 369/112.12, 44.12, 44.14, 44.23, 103, 112.15, 112.19, 112.03, 109, 112.17, 112.16, 126; 359/281, 484; 372/29.02, 29.011, 32, 37, 56, 106

(56) References Cited

U.S. PATENT DOCUMENTS

| | | |
|---|---|---|
| 3,506,334 A | 4/1970 | Korpel |
| 3,597,701 A | 8/1971 | Cornillault |
| 3,603,685 A | 9/1971 | Heflinger |
| 4,789,978 A | 12/1988 | Shikama et al. |
| 5,071,253 A | 12/1991 | Chase |
| 5,119,454 A | 6/1992 | McMahon |
| 5,390,203 A * | 2/1995 | Miller .......................... 372/106 |
| 5,587,983 A | 12/1996 | Bailey |
| 5,646,920 A | 7/1997 | Raczynski |
| 5,677,902 A * | 10/1997 | Brazas, Jr. .............. 369/112.03 |
| 5,708,644 A * | 1/1998 | Hasegawa ................. 369/44.12 |
| 5,739,943 A * | 4/1998 | Ohshima et al. ............ 359/281 |

* cited by examiner

*Primary Examiner*—David Hudspeth
*Assistant Examiner*—Kim-Kwok Chu
(74) *Attorney, Agent, or Firm*—Pawlak & Associates; Elizabeth J. Pawlak

(57) ABSTRACT

An optical apparatus for reading from and writing to an ultra high density disk and comprising a light source emitting a pencil of light rays to an optical path along an optical axis; two interferometers, a beamsplitter, a quarter-wave plate, and an objective lens. The pencil of light rays is transmitted through the apparatus to become a narrow fringe ring which in turn is used to generate an ultra small spot of light. The resulting ultra small spot of light can address far more storage locations per a same unit area than a conventional much larger spot of light.

31 Claims, 12 Drawing Sheets

ULTRA HIGH DENSITY DISK READER/ WRITER COMPRISING TWO INTERFEROMETERS

This application is a continuation-in-part of U.S. patent application Ser. No. 09/035,824, by Roland H. Chase, filed Mar. 6, 1998, now U.S. Pat. No. 6,269,066.

BACKGROUND OF THE INVENTION

The technological growth of the computer industry has been progressing at an extremely fast pace. Products that are barely three years old are considered obsolete. The demand for more powerful computers translates into demands of faster data processing speed and greater data storage capacity. The present invention fits in the category of meeting the demand for greater data storage capacity. Presently, data stored on an optical data it storage device are retrieved by observing the behavior of light being reflected from the optical data storage device. As storage capacity increases, the amount of data per unit of area increases. A practical limitation of the storage capacity of an optical data storage device is the size of a spot of light that can be generated by a reader/writer head and the technology available to precisely move and control its position. The present invention discloses a spot of light that is considerably smaller than those currently being used in the market place.

SUMMARY OF THE INVENTION

The present invention discloses a novel method and apparatus to produce an extremely small spot of light and electronically control its position.

DETAIL DESCRIPTION OF THE INVENTION

Figure 1:
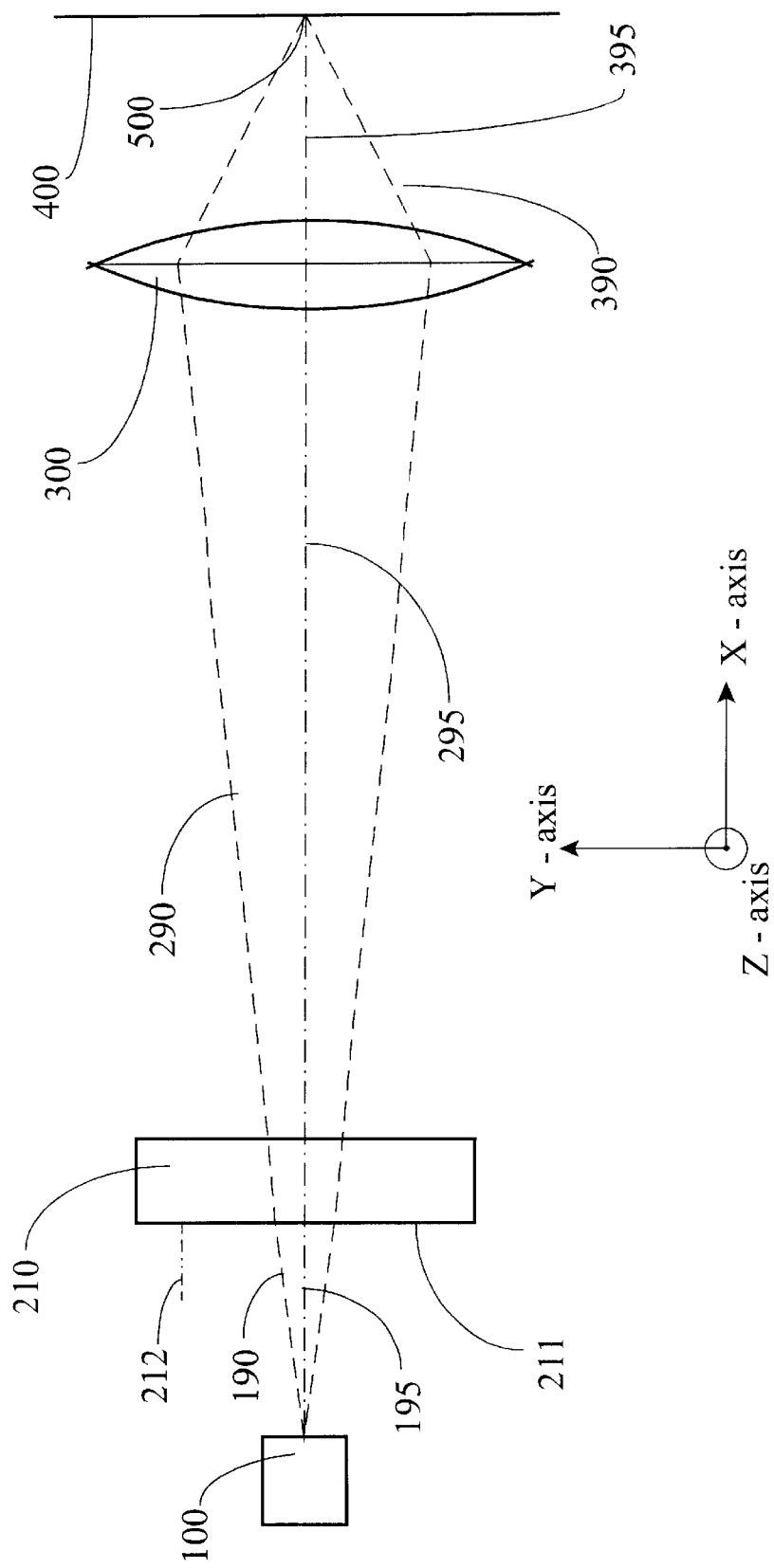
FIG. 1 illustrates a first embodiment of an optical configuration using a Fabry-Perot interferometer and a spectral light source.

FIG. 1 shows an optical system employing a conventional Fabry-Perot interferometer. The Fabry-Perot interferometer is an angle filter and is the basis of this invention.

In FIG. 1, the X-axis is parallel to an optical axis 395 of the Objective lens 300. The Y-axis lies in a plane of the drawing and is perpendicular to axis 395. The Z-axis is perpendicular to the plane of the drawing.

A spectral light source 100 emits a pencil of light rays 190. The central ray 195 of pencil 190, is incident upon a Fabry-Perot interferometer 210, in a direction normal to entrance face 211 as figuratively illustrated by a broken line 212. Central ray 195 is parallel to an optical axis 395 of the Objective lens 300.

It is a long established principal of multiple-beam interference phenomenon, well known to those skilled in the art of physical optics, that of the infinite number of light rays incident upon a Fabry-Perot interferometer, only those having angles normal to the entrance face 211 can successfully transited through the interferometer. All other light rays suffer destructive interference thus are filtered out.

Figure 2:
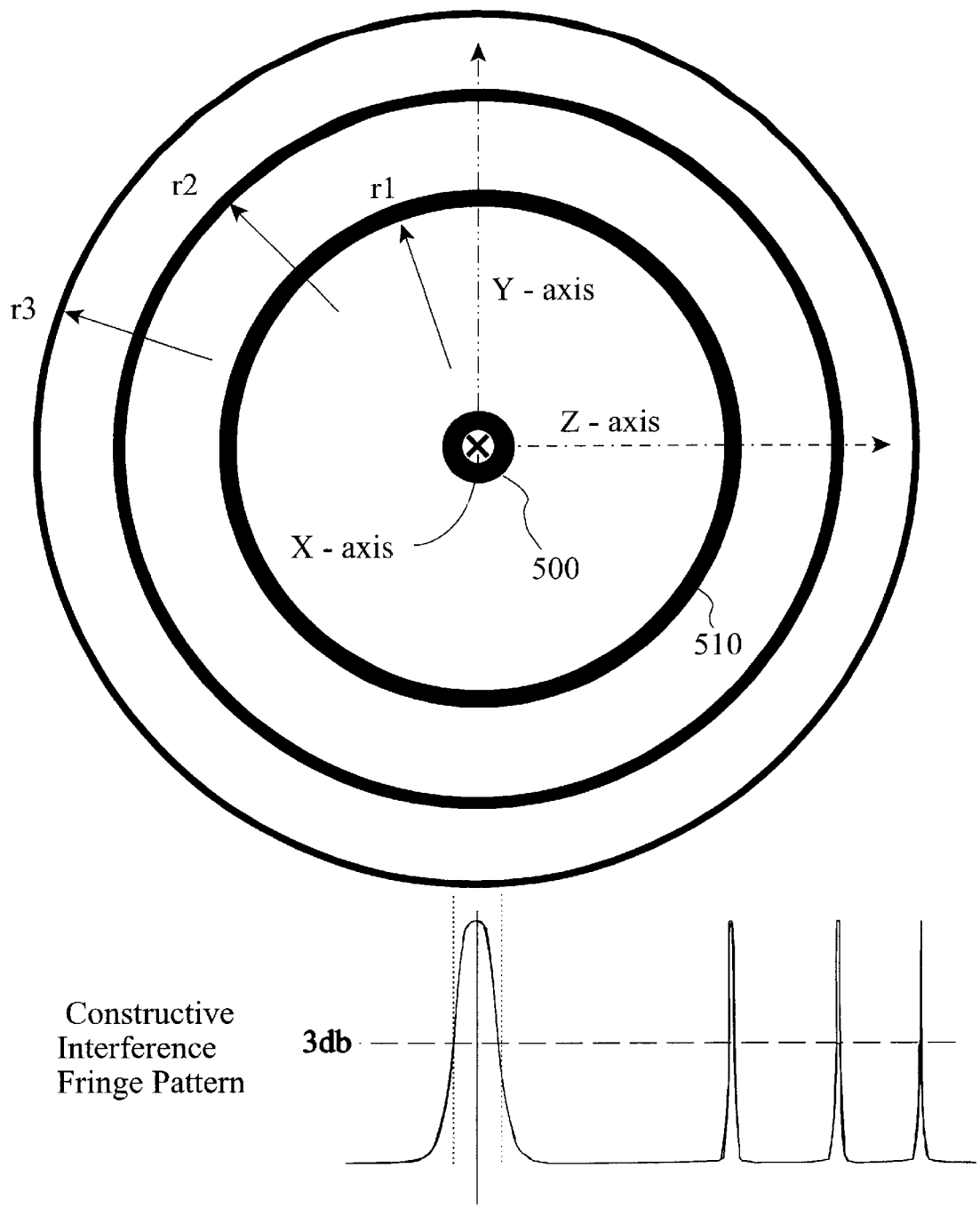
FIG. 2 illustrates an annular constructive interference fringe rings produced by the first embodiment as shown in FIG. 1.

Those light rays successfully transmit through interferometer 210 are collected by Objective lens 300, to be converged into annular constructive interference fringe rings on a focal plane 400. These annular constructive interference fringe rings are shown in FIG. 2. The central fringe 500 is shown at the focal point of lens 300 with a first annular ring fringe 510 located at a radius r1 from the central fringe 500. r1 is defined as:

$r1 = \arctan(\theta 1/f)$ where $\theta 1$ is an angle relative to the normal broken line 212 inside pencil 190, and f is a focal length of lens 300. Likewise r2, the radius of the second annular ring fringe, 520, and r3, the radius of the second annular ring fringe 530, are defined as:

$r2 = \arctan(\theta 2/f)$; and $r3 = \arctan(\theta 3/f)$.

Figure 2A:
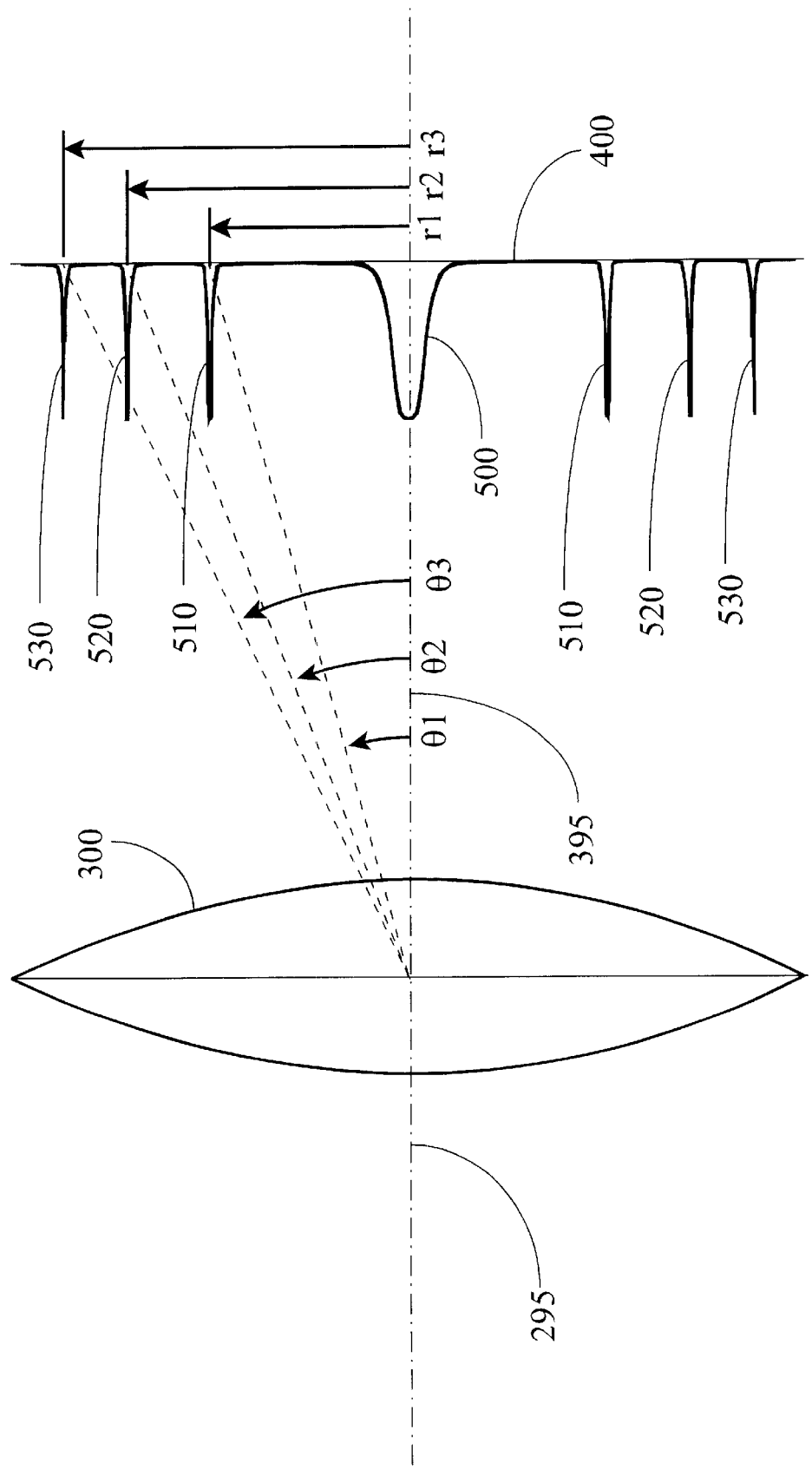
FIG. 2a illustrates an intensity distribution of the constructive interference fringes in a focal plane.

FIG. 2a shows the relation between these radii, angles, and lens 300 and focal plane 400. Angles $\theta 1$, $\theta 2$, and $\theta 3$ are defined by a design of the interferometer as shown in a sample calculation included hereinbelow.

It should be noted that the closer is the fringe to the focal point of lens 300, the wider is the fringe. Conversely, the farther is a fringe from the focal point of lens 300, the narrower is the fringe. Since FIG. 2 is drawn on white paper, the colors are reversed. The black rings actually represent high intensity constructive interference fringe rings and the white spacing therebetween represent regions void of light, also known as a regions of destructive interference where light rays have been filtered out of pencil 190.

Figure 3:
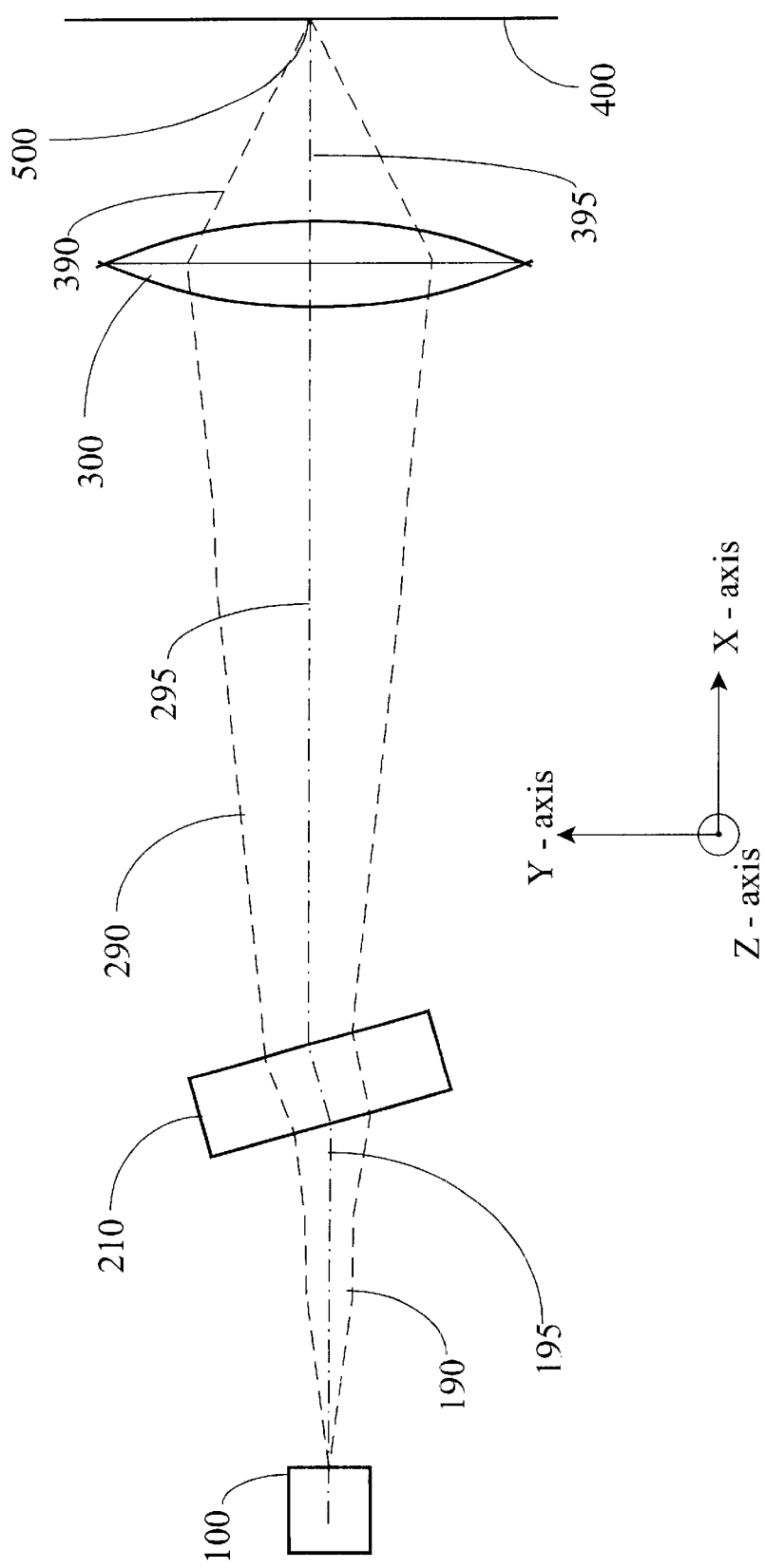
FIG. 3 illustrates a second embodiment of an optical configuration using a Fabry-Perot interferometer and a spectral light source.
Figure 4:
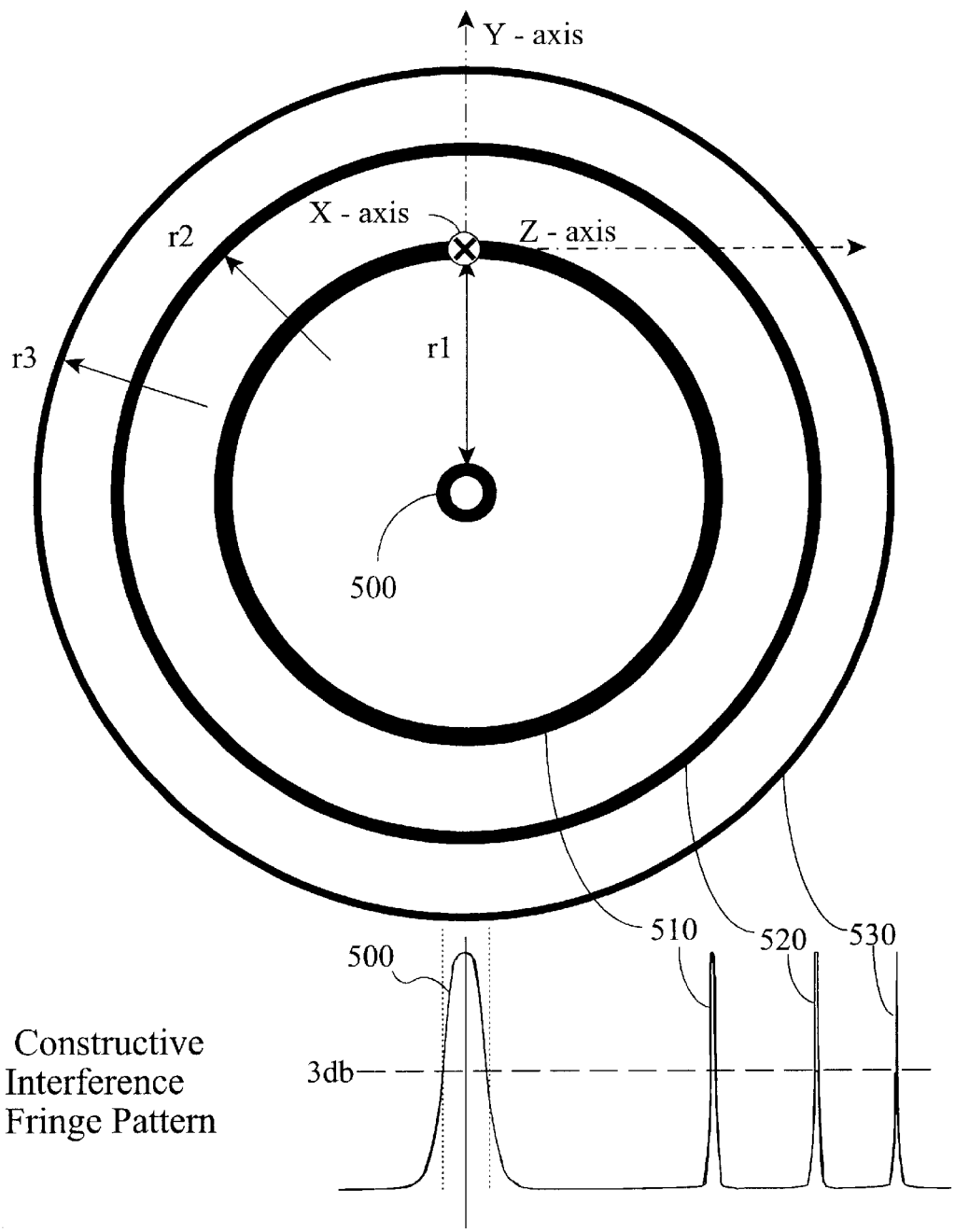
FIG. 4 illustrates an annular constructive interference fringe rings produced by the second embodiment as shown in FIG. 3.

The second embodiment of an optical configuration using a Fabry-Perot interferometer and a spectral light source is shown in FIG. 3. This is a modification of FIG. 1 wherein interferometer 210 has been rotated by an angle $\theta 1$ about the Z-axis. This causes fringe 510 to be displaced in focal plane 400 along the Y-axis by a distance r1, as shown in FIG. 4.

Figure 5:
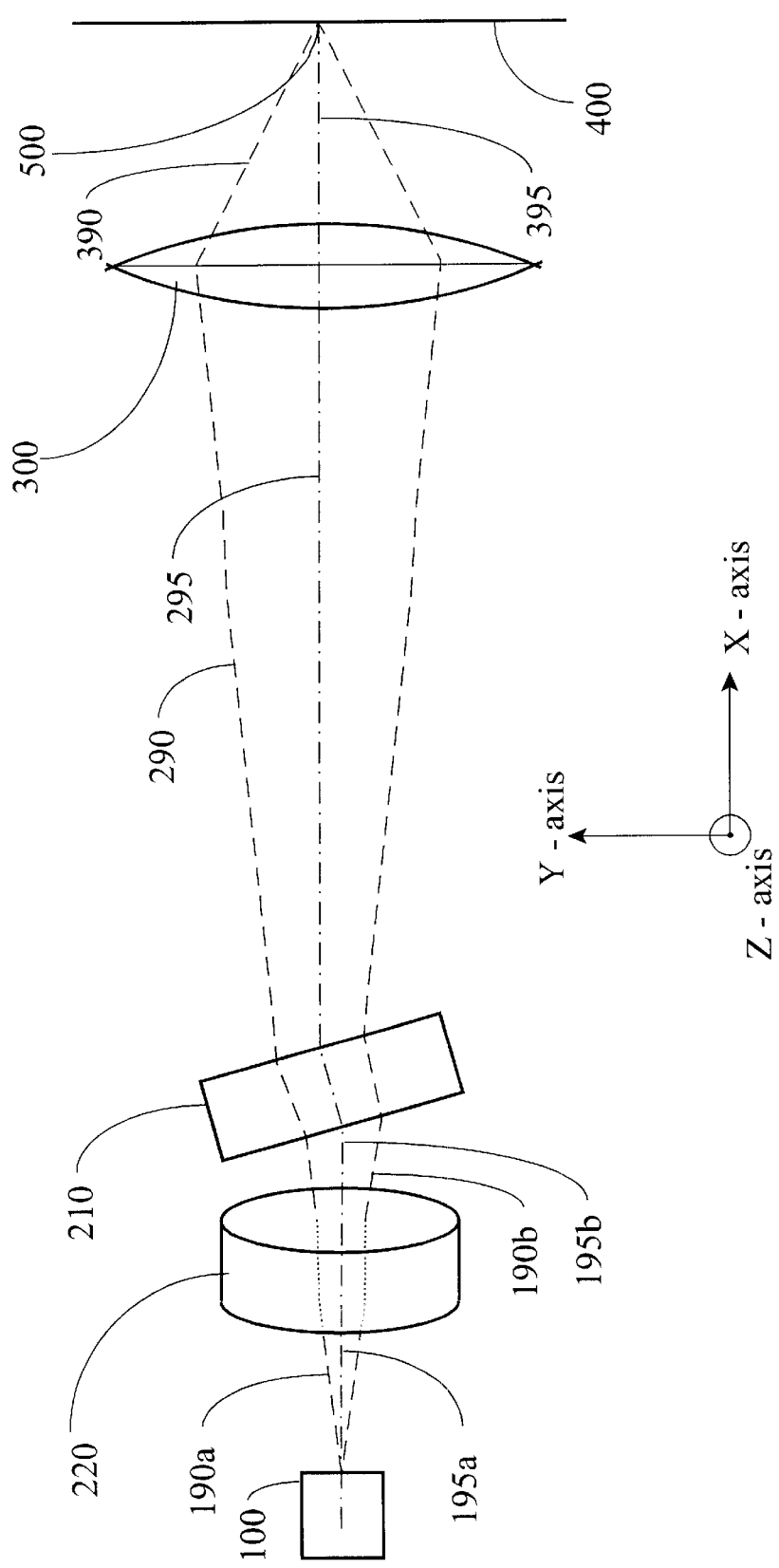
FIG. 5 illustrates a third embodiment of an optical configuration using two Fabry-Perot interferometers and a spectral light source.

The third embodiment of an optical configuration using two Fabry-Perot interferometers and a spectral source is shown in FIG. 5. This is a modification of FIG. 3 wherein a second Fabry-Perot interferometer 220 has been added. For the sake of clarity, the fringe that would be transmitted by interferometer 210 is labeled as 510a while those that would be transmitted by interferometer 220 are labeled as 510b.

Figure 6:
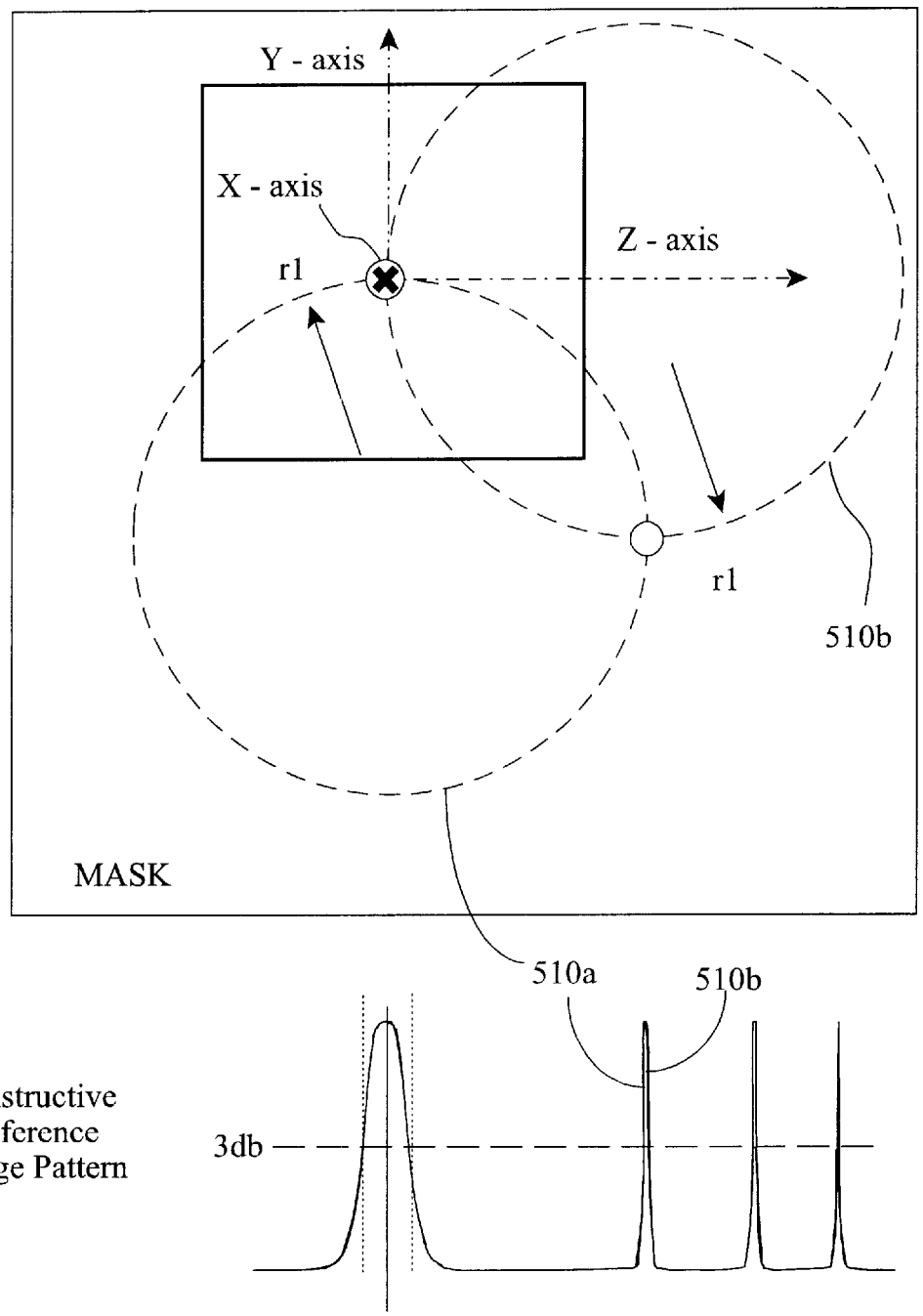
FIG. 6 illustrates two annular constructive interference fringe rings produced by the third embodiment as shown in FIG. 5.

Interferometer 220 has been rotated by an angle $\theta 1$ about the Y-axis and interferometer 210 has been rotated by an angle θ1 about the Z-axis. This causes fringe 510a to be displaced in the focal plane of lens 300, along the Y-axis by a distance r1, and fringe 510b to be displaced in the focal plane of lens 300, along the Z-axis by a distance r1, as shown in FIG. 6.

Because interferometer 210 can only permit transmission of light rays making an angle θ1 with respect to the normal broken line 212 and interferometer 220 can only transmit rays making an angle θ1 with respect to the normal broken line 212, spots only appear in the focal plane when these conditions are met. A preferred spot is located at the focal point of lens 300. A complimentary spot lies diagonally bisecting the Y-axis and Z-axis. The complimentary spot is masked out.

The Fabry-Perot interferometer is only one member out of a family of instruments that employ the principals of multiple-beam interference. Other members of this family include the Lummer-Gehrcke interferometer, the interference filter, and the frustrated total reflection interference filter. All of these instruments regenerate every single light ray, from a pencil of light rays, into a multitude of parallel, geometrically degraded amplitude, phase related light rays. When a set of parallel rays are brought to separate points in the focal plane of a lens, they M will interfere with each other. The intensity of the light ray at each point depends on the number of optical paths between sequential parallel plates the light ray has traveled. If the path difference between sequential sets of rays is an integer number of wavelengths, then the intensity is at a maximum. If it is a half integer, the intensity is zero. Any other value of the path difference will yield an intermediate intensity.

Thus, in addition to the Fabry-Perot interferometer, this invention will function with either a Lummer-Gehrcke interferometer, an interference filter, or a frustrated total reflection interference filter.

Figure 7:
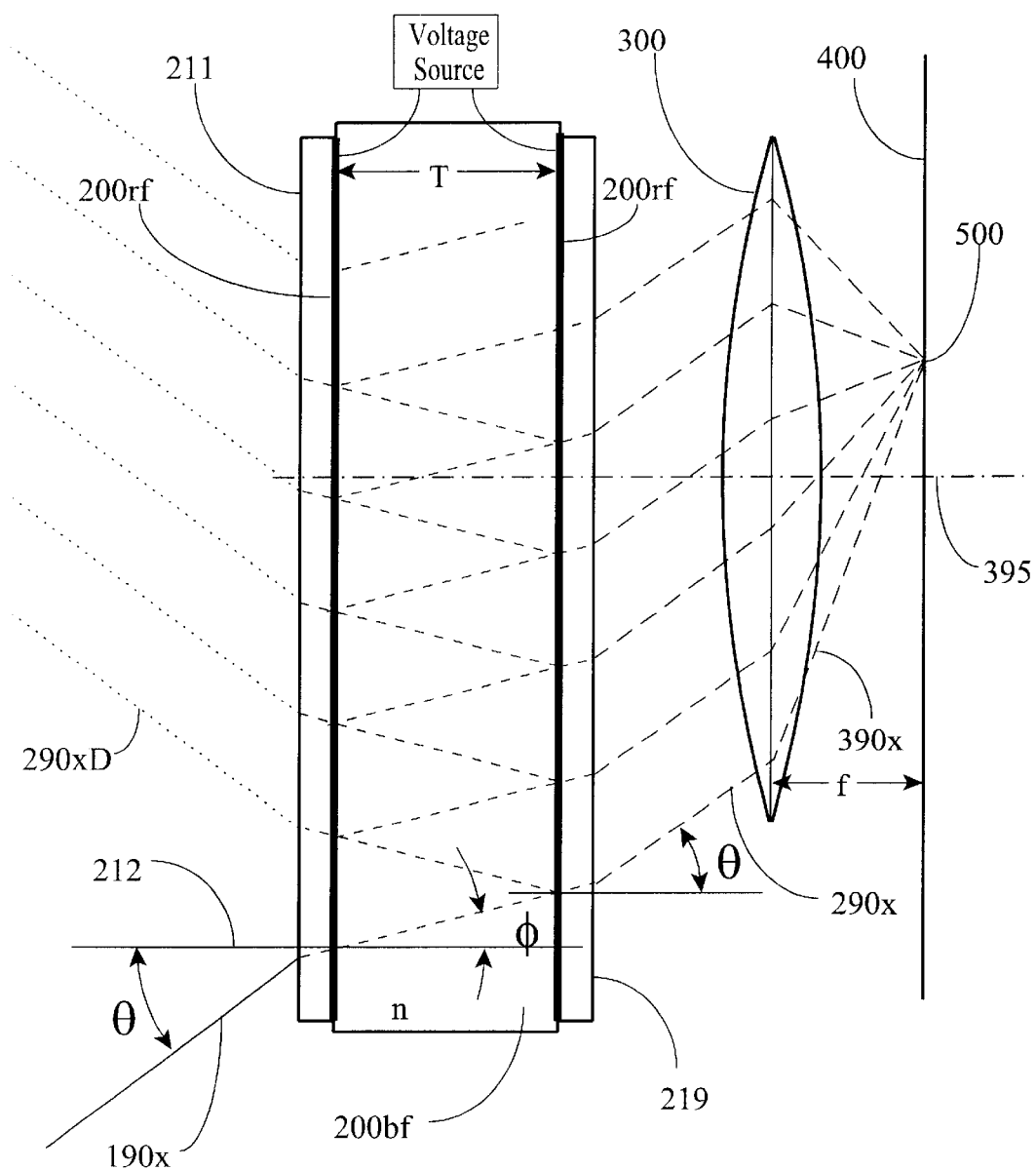
FIG. 7 illustrates a Fabry-Perot interferometer configured as an electro-optical device containing a media inside the interferometer that exhibits Kerr or Pockel effect.

FIG. 7 illustrates by way of an example a Fabry-Perot interferometer functioning as an electro-optical device employing the Kerr or Pockel effect. It should be noted that the electro-optical device can also be a Lummer-Gehreke interferometer, interference filter, or frustrated total reflection interference filter. The medium inside the Fabry-Perot interferometer, Lummer-Gehreke interferometer, interference filter, or frustrated total reflection interference filter can be an electro-optical material so that a voltage applied across therein will change an index of the medium thus causing angles that can propagate through the instrument to change. The medium can be various types of gases, liquids or solids, such as KD*P.

A design sample showing detailed calculations and designed parameters are included hereinbelow. As shown, the total number of bytes that can be easily generated by the present invention is in the order of 109.1 giga bytes on a 120-millimeter diameter disk.

If the medium between the reflecting surfaces is an electro-optical material, then the optical path changes when an electric or magnetic field is applied therethrough. This changes the angle of constructive interference, thus changing the location of the spot, or constructive interference fringe on focal plane 400.

A magnetic or electric field applied to the spectral source changes the wavelength of the source. This also changes the location of the spot on focal plane 400. It is desirable for the optical apparatus for reading information from and writing information to a data storage device to comprise: (a) a light source emitting a pencil of light rays to an optical path along an optical axis; (a) an interferometer; (c) a beamsplitter; (d) a quarter wave plate; and (e) an objective lens; wherein the pencil of light rays is transmitted respectively through the interferometer, the beamsplitter, the quarter-wave plate, and the objective lens to become constructive interference fringes of light upon reaching the data storage device and wherein the light source is a laser diode and the spectral source resides inside an electric field so that the wavelength of the pencil of light rays are Stark split into a plurality of wavelengths.

Additional embodiments of the apparatus of the present invention include an optical apparatus for reading information from and writing information to a data storage device, comprising: (a) a light source surrounded by a coil generating either an electric field or a magnetic field and emitting a pencil of light rays to an optical path along an optical axis; ~(b) an interferometer; and (c) an objective lens and wherein the pencil of light rays is transmitted respectively through the interferometer and objective lens to become constructive interference fringes of light upon reaching said field-controlled location on a focal plane of the objective lens and wherein the light source is a laser diode with the spectral source residing inside an electric field so that a wavelength of the pencil of light rays are Stark split into a plurality of wavelengths.

Figure 8:
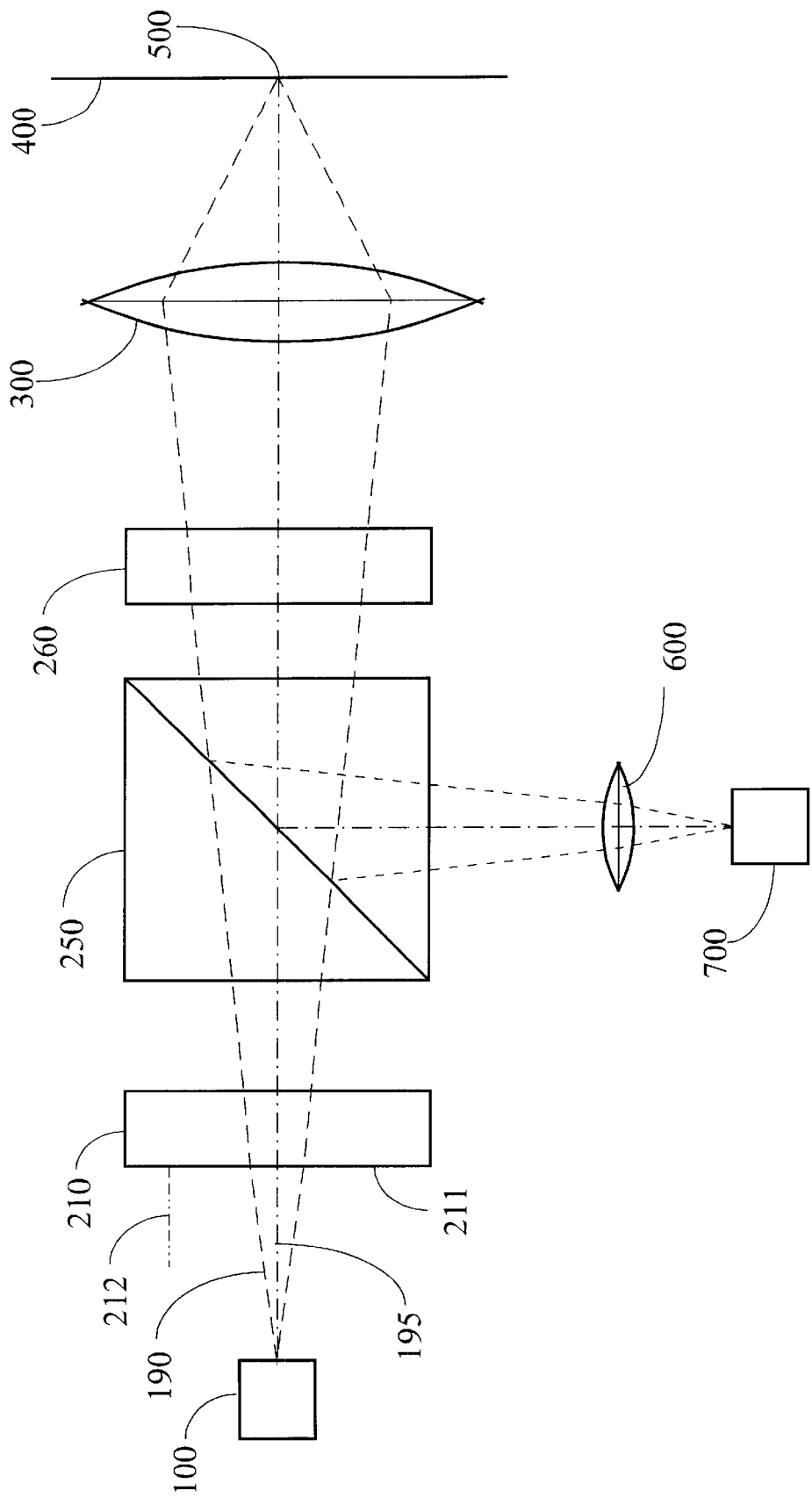
FIG. 8 illustrates a first embodiment of an ultra high density optical disk reader/writer.
Figure 9:
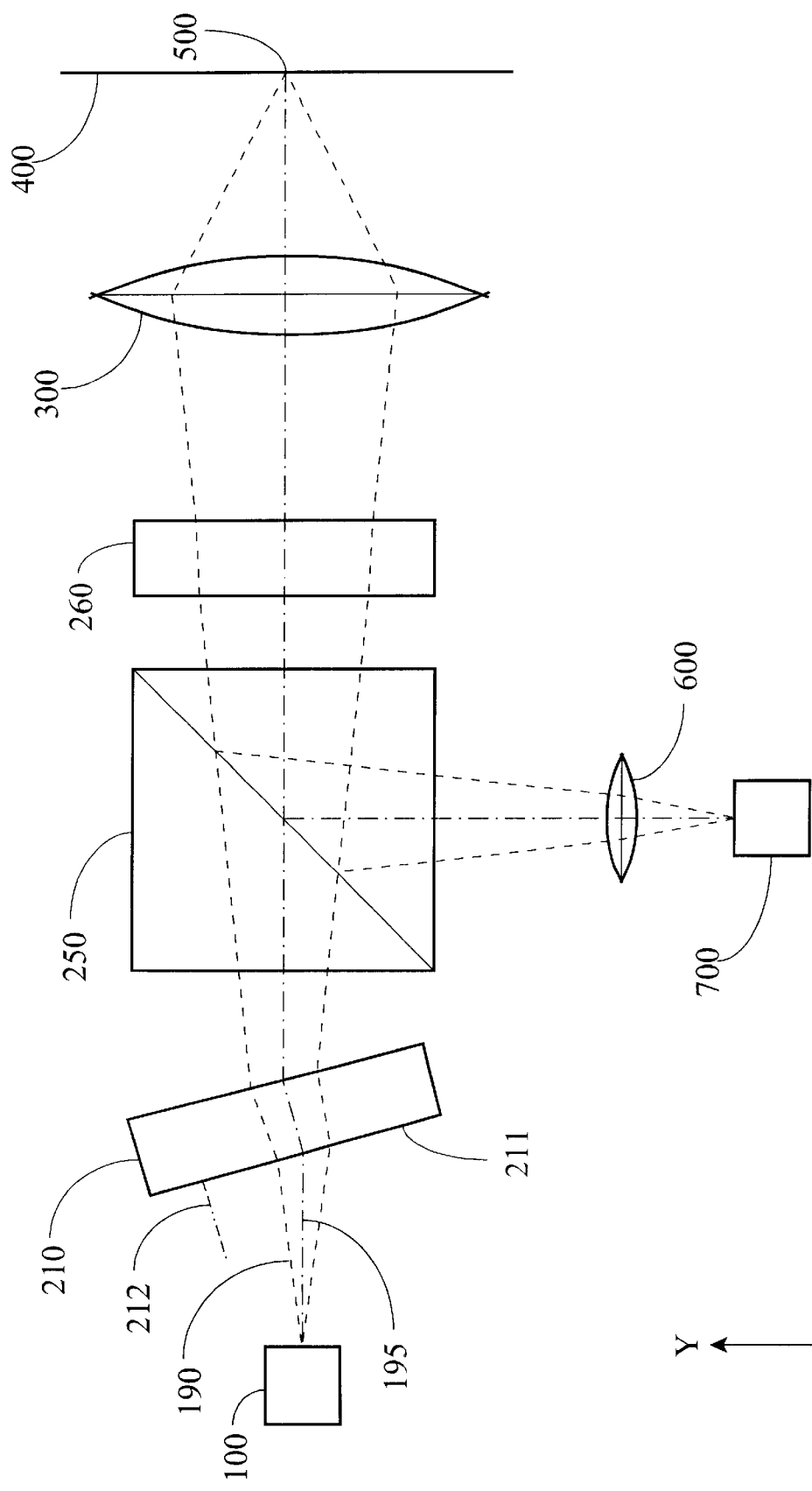
FIG. 9 illustrates a second embodiment of an ultra high density optical disk reader/writer.
Figure 10:
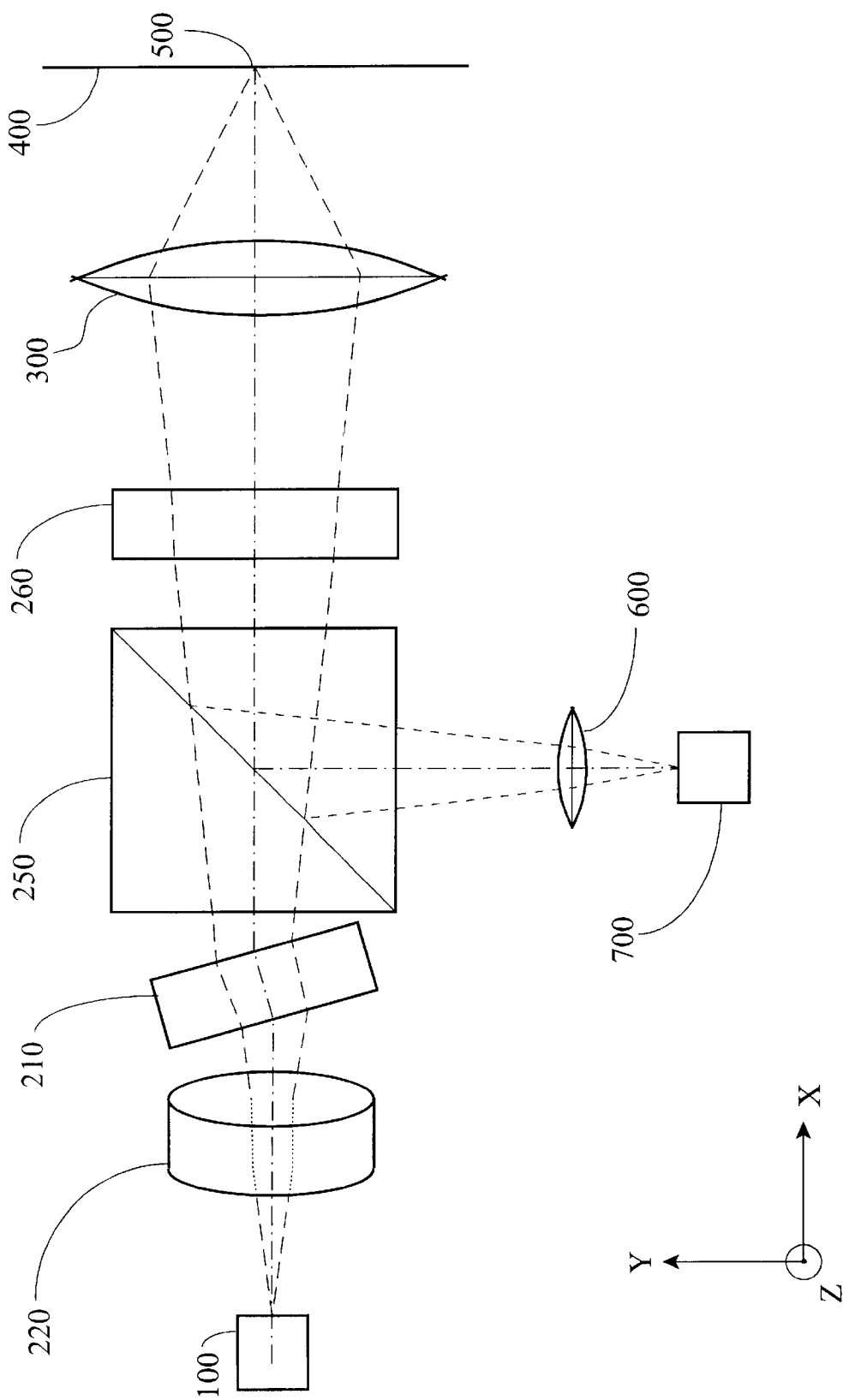
FIG. 10 illustrates a third embodiment of an ultra high density optical disk reader/writer.

Various embodiments of the ultra high density optical disk readers as shown in FIG. 8, FIG. 9, and FIG. 10 are correspondingly based on various embodiments of ultra small spot generators as shown in FIG. 1, FIG. 3 and FIG. 5.

FIG. 8 illustrates a read/write optical head wherein a spot in the focal plane of a lens is illuminated and characteristics of reflected light rays are detected. Here, source 100 emits a diverging pencil 190, polarized in the plane of the drawing, which is transmitted through Fabry-Perot interferometer 210, polarizing beam splitter 250, quarter-wave plate 260, and lens 300 to produce spot 500 on focal plane 400. The quarter-wave plate rotates the polarization, about the optical axis by 45 degrees.

When spot 500 is reflected from focal plane 400, the light rays return through lens 300 as a converging pencil into the quarter-wave plate 260. Quarter-wave plate 260 rotates the polarization about the optical axis by an additional 45 degrees so that it is now perpendicular to the plane of the drawing. Thus the pencil of light rays will be totally reflected as they pass through polarizing beam splitter 250. These light rays are then passed through lens 600 onto a photon detector 700.

FIG. 9 is the same as FIG. 8 except Fabry-Perot interferometer 210 has been rotated by an angle θ1 about the Z-axis.

FIG. 10 is the same as FIG. 9 except an additional Fabry-Perot interferometer 220 has been added. Interferometer 220 has been rotated by an angle θ1 about the Y-axis and interferometer 210 has been rotated by an angle θ1 about the Z-axis.

Figure 11:
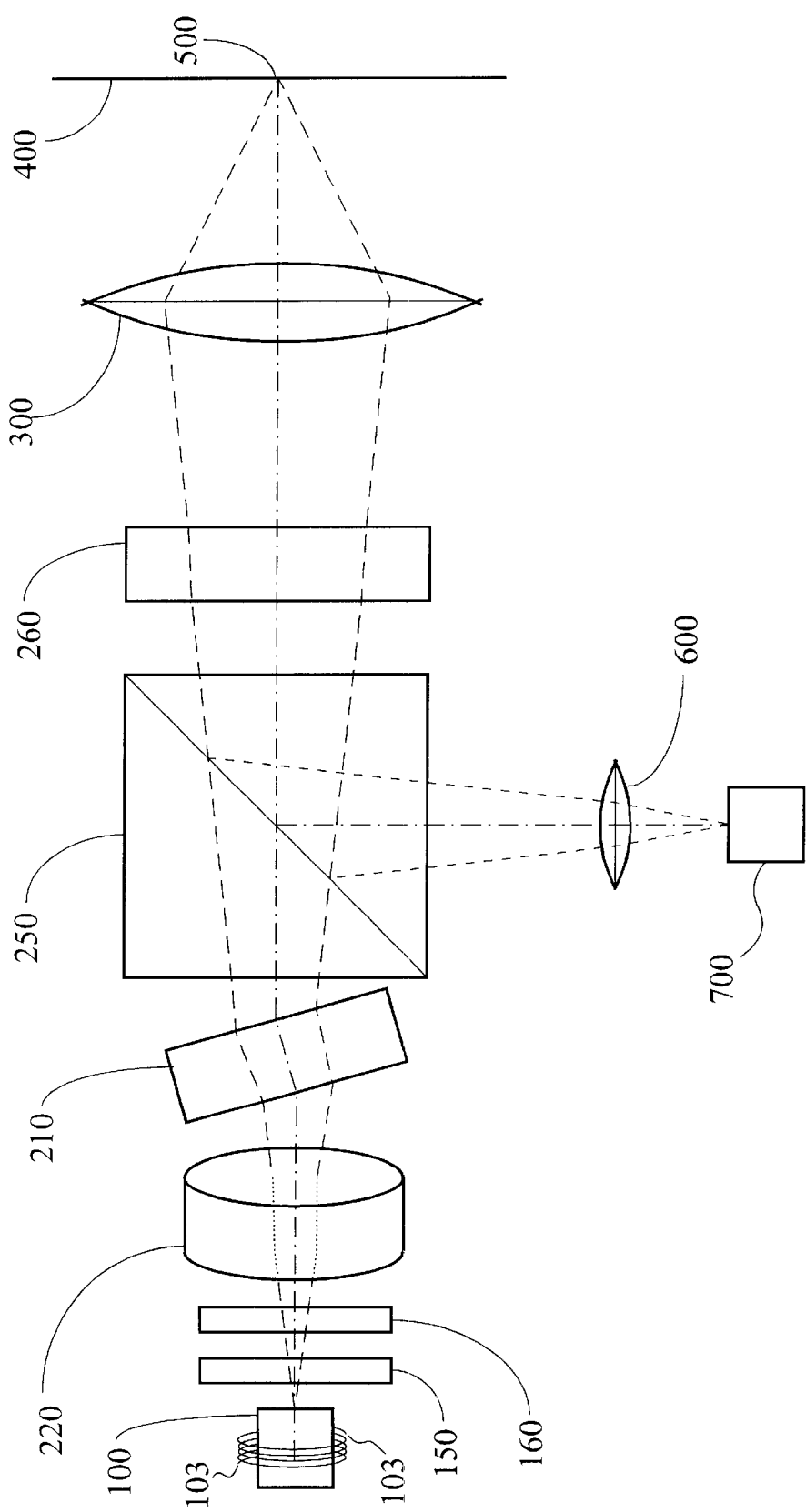
FIG. 11 illustrates a mechanism employed to electronically control the location of the ultra small spot of light.

FIG. 11 illustrates a mechanism that electronically controls the location of the ultra small spot of light on the focal plane 400. Source 100 is subjected to a coil 103 generating a magnetic field parallel to the optical axis of lens 300. This causes the wavelength of these light rays to split into multiple wavelengths. Ideally, there would be two wavelengths. A set of rays with one wavelength would be right circularly polarized and a set of rays with another wavelength would be left circularly polarized. The separation of these wavelengths is a function of the intensity of the magnetic field.

Both sets of light rays pass through a quarter-wave plate 150 that is constructed of a material with Kerr or Pockel effects. Thus, by impressing a specific electric field on plate 150, both sets of circularly polarized rays become linearly polarized. For example, the right circularly polarized light will become linearly polarized in the plane of the drawing and the left circularly polarized light will become linearly polarized perpendicular to the plane of the drawing.

These rays are then transmitted through polarizing filter 160 where one ray is filtered out.

Thus, by changing the intensity of the electric field on plate 150, the wavelength of the rays being transmitted by interferometer 210 and interferometer 220 is changed. This in turn will cause the constructive interference fringe of ultra small spot of light to appear at different locations of focal plane 400.

By adjusting the intensity of the magnetic field at source 100, the wavelength of the Zeeman split light ray can be adjusted to equal the pit width. The spot can then be made to oscillate from one side of a target to another by oscillating the electric field on quarter-wave plate 150. Thus, the intensity of the signal at detector 700 will define the magnitude of any difference between where the spot should be and the pit and its phase will define the direction of the error.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

Sample calculations of the present invention are shown hereinbelow.

Fabry-Perot Configured ETOS (FPCD.mcd)

| | |
|---|---|
| Wavelength of the laser | $\lambda := 0.635$ microns |
| Focal length of the objective lens | $f := 1000.000$ microns |
| Index of refraction of the Fabry-Perot (KD*P) | $n := 1.502$ |
| Numerical aperture of the objective lens | $NA := 0.45$ |
| Diameter of the objective lens | $D := 2 \cdot f \cdot NA$     $D = 900$ microns |
| Radius of the 3db intensity contour | $r3db := 0.446$ microns |

Design objectives (based on the intensity contours used by the DVD System)

If the principal constructive interference fringe is at the center of the pit being read then
Ipw = intensity of the maximum circle inside the pit    $Ipw := 0.811$
Ipl = intensity of the circle encompassing the minimum pit    $Ipl := 0.695$
Ias = intensity at the center of the adjecent spiral    $Ias := 0.257$
The first constructive interference fringe ring [order of interference (M − 1)]

Radius in the focal plane     $r1 := 15$ microns

Angle with respect to the optical axis     $\theta1 := \operatorname{atan}\left(\dfrac{r1}{f}\right)$     $\theta1 = 0.014999$ radians Transmission angle through the Fabry-Perot     $\phi1 := \operatorname{asin}\left(\dfrac{\sin(\theta1)}{n}\right)$     $\phi1 = 0.009986$ radians Interferometer configuration parameters Order of interference     $M := \operatorname{floor}\left(\dfrac{1}{1 - \cos(\phi1)}\right)$     $M = 20057$ $\sin(M \cdot \pi)^2 = 0$
$\sin((M - 0.5) \cdot \pi)^2 = 1$
$\sin((M - 1) \cdot \pi)^2 = 0$ Thickness of the Fabry-Perot Interferometer     $T := \dfrac{M \cdot \lambda}{2 \cdot n}$     $T = 4.24 \cdot 10^3$ microns $\theta3db := \operatorname{atan}\left(\dfrac{r3db}{f}\right)$     $\theta3db = 0.000446$ $\phi3db := \operatorname{asin}\left(\sin\left(\dfrac{\theta3db}{n}\right)\right)$     $\phi3db = 0.000297$ $M3db := \dfrac{2 \cdot T \cdot n \cdot \cos(\phi3db)}{\lambda}$     $M3db = 2.0057 \cdot 10^4$     $\sin(M3db \cdot \pi)^2 = 7.717 \cdot 10^{-6}$ Coefficient of reflection     $R := 0.95$     $R = 0.95$ Intensity distribution constance     $F := \dfrac{4 \cdot R}{(1 - R)^2}$     $F = 1.52 \cdot 10^3$ -continued The second constructive interference fringe ring [order of interference (M − 2)]

Transmission angle through the Fabry-Perot $\quad \phi 2 := \mathrm{acos}\left(\dfrac{M-2}{M}\right) \quad \phi 2 = 0.014$ radians Angle with respect to the optical axis $\quad \theta 2 := \mathrm{asin}(n \cdot \sin(\phi 2)) \quad \theta 2 = 0.021$ radians
Radius in the focal plane $\quad r2 := f \cdot \tan(\theta 2) \quad r2 = 21.216$ microns The third constructive interference fringe ring [orede of interference (M − 3)]

Transmission angle through the Fabry-Perot $\quad \phi 3 := \mathrm{acos}\left(\dfrac{M-3}{M}\right) \quad \phi 3 = 0.017$ radians Angle with respect to the optical axis $\quad \theta 3 := \mathrm{asin}(n \cdot \sin(\phi 3)) \quad \theta 3 = 0.026$ radians
Radius in the focal plane $\quad r3 := f \cdot \tan(\theta 3) \quad r3 = 25.986$ microns Radial distribution (from the center of the fringe) of the intensity at the surface of the disk $i := 0, 1 \ldots 2000$ $r_i := \dfrac{r1 \cdot i}{1000}$ $\theta_i := \mathrm{atan}\left(\dfrac{r_i}{f}\right) \qquad \phi_i := \mathrm{asin}\left(\dfrac{\sin(\theta_i)}{n}\right) \qquad \delta_i := \dfrac{4 \cdot \pi \cdot n \cdot T \cdot \cos(\phi_i)}{\lambda} \qquad I_i := \dfrac{1}{1 + F \cdot \sin\left(\dfrac{\delta_i}{2}\right)^2}$

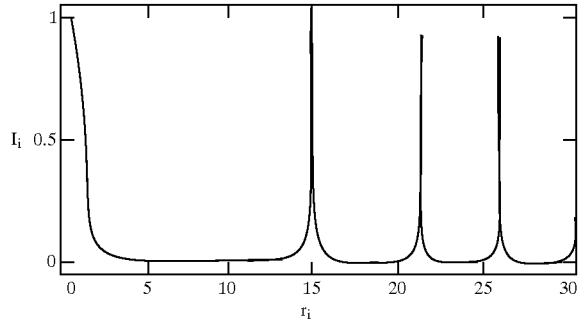

$\delta r := \dfrac{r1}{1000}$

Radial distribution of the intensity of the Central fringe $I3db_i := \mathrm{if}(I_i < 0.5, 0, 1)$

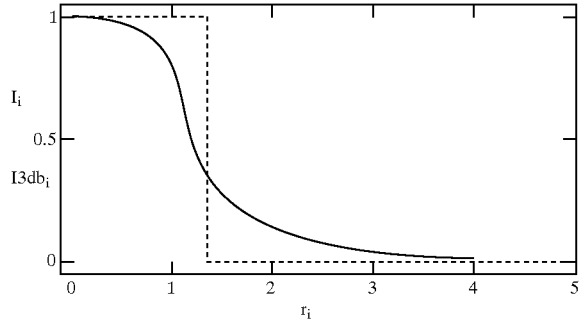

Opertional Fringe Intensity distribution at the surface of the disk $j := 0, 1 \ldots 2000$ $r_j := 10 + \dfrac{j}{200}$ -continued $$\theta_i := \operatorname{atan}\left(\frac{r_i}{f}\right) \qquad \phi_i := \operatorname{asin}\left(\frac{\sin(\theta_i)}{n}\right) \qquad \delta_i := \frac{4 \cdot \pi \cdot n \cdot T \cdot \cos(\phi_i)}{\lambda} \qquad I_j := \frac{1}{1 + F \cdot \sin\left(\frac{\delta_j}{2}\right)^2}$$

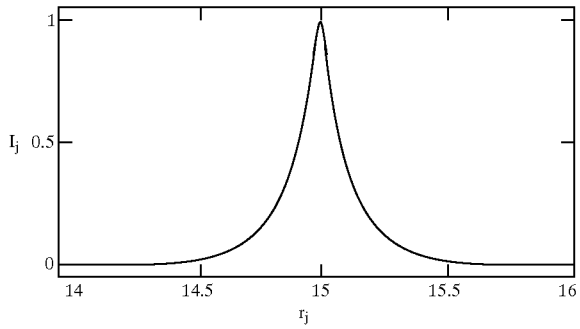

Opertional fringe intensity factors $$pit_j := if(I_j < Ipw, 0, 1) \qquad mpl_j := if(I_j < Ipl, 0, 1) \qquad pitch_j := if(I_j < Ias, 0, 1) \qquad \text{microns}$$

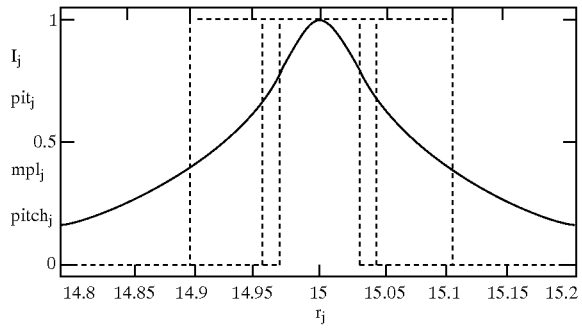

Sampleling interval $\qquad \Delta := \dfrac{r_{2000} - r_0}{2000} \qquad \Delta = 0.005$ microns Fringe parameters 3db Beam width: $\qquad I_j := I_j \qquad hpp_j := if(I_j < 0.5, 0, 1) \qquad$ half power points $$BW := \Delta \cdot \sum_j hpp_j \qquad \sum_j hpp_j = 25 \qquad BW = 0.125 \text{ microns}$$

Pit width:

$$pw := \Delta \cdot \sum_j pit_j \qquad \sum_j pit_j = 11 \qquad pw = 0.055 \text{ microns}$$

Minimum pit length:

$$pl := \Delta \cdot \sum_j mpl_j \qquad \sum_j mpl_j = 17 \qquad pl = 0.085 \text{ microns}$$

Pitch of the spiral:

$$pch := 0.5 \cdot \Delta \cdot \sum_j pitch_j \qquad \sum_j pitch_j = 41 \qquad pch = 0.1025 \text{ microns}$$

Disk storage ro = outer radius of the data storage ring $\qquad$ ro := $5.8 \cdot 10^4$ microns
ri = inter radius of the data storage ring $\qquad$ ri := $2.5 \cdot 10^4$ microns ns = number of data spirls (revolutions of the disk) $\qquad ns := \dfrac{ro - ri}{pch} \qquad ns = 3.22 \cdot 10^5$ revolutions ls = length of the data spiral $\qquad ls := \pi \cdot ns \cdot (2 \cdot ri \mid (ns\ 1) \cdot pch)$
$\qquad ls = 8.395 \cdot 10^{10}$ microns -continued nlpp = number of "land/pit" pairs in the data spiral $\quad$ nlpp := $\dfrac{ls}{2 \cdot pl}$ $\quad$ nlpp = 4.938 · 10$^{11}$ btp = bytes to pits conservision $\quad$ btp := 0.221
tnb = total number of bytes $\quad$ tnb := nlpp · btp $\quad$ tnb = 1.091 · 10$^{11}$ bytes
Physical Constances C = speed of light (microns/second) $\qquad\qquad\qquad\qquad\qquad\qquad\qquad$ C := 3 · 10$^{14}$
r = electro-optic coefficient (microns/volts) $\qquad\qquad\qquad\qquad\qquad\;\,$ r = 3.22 · 10$^{-5}$
$\epsilon$ = dielectric constant: $\qquad\qquad\qquad\qquad\qquad\qquad\qquad\qquad\quad\;\,$ $\epsilon$ := 44.5
kZ = Zeeman constant $\qquad\qquad\qquad\qquad$ kZ := 7.142857 · 10$^{-7}$ · C $\quad$ kZ = 2.143 · 10$^{8}$ pr := $\dfrac{pw}{2}$ $\qquad$ pr = 0.0275 $\qquad$ pch = 0.103

$\theta$hpw := atan$\left(\dfrac{r1 - pr}{f}\right)$ $\quad$ $\theta 1$ = 0.014999 $\quad$ $\theta$pch := atan$\left(\dfrac{r1 - pch}{f}\right)$ $\quad$ $\theta$pch = 0.014896
$\qquad\qquad\qquad\qquad\quad\;$ $\theta$hpw = 0.014971

$\phi$hpw := asin$\left(\dfrac{\sin(\theta \text{bpw})}{n}\right)$ $\quad$ $\phi 1$ = 0.009986 $\quad$ $\phi$pch := asin$\left(\sin\left(\dfrac{\theta \text{pch}}{n}\right)\right)$ $\quad$ $\phi$pch = 0.009918
$\qquad\qquad\qquad\qquad\qquad\;\;$ $\phi$hpw = 0.009967 nhpw := $\dfrac{(M-1)\cdot \lambda}{2 \cdot T \cdot \cos(\phi \text{hpw})}$ $\quad$ nhpw = 1.501999724 $\quad$ npch := $\dfrac{(M-1)\cdot \lambda}{2 \cdot T \cdot \cos(\phi \text{pch})}$ $\quad$ npch = 1.501998982

Vhpw := $\dfrac{2\cdot(n - \text{nhpw})\cdot T}{r \cdot n^3}$ $\quad$ Vhpw = 21.427 $\quad$ Vpch := $\dfrac{2\cdot(n - \text{npch})\cdot T}{r \cdot n^3}$ $\quad$ Vpch = 79.126

$\lambda$hpw := $\dfrac{2 \cdot T \cdot n \cdot \cos(\phi \text{hpw})}{M - 1}$ $\quad$ $\lambda$hpw = 0.635000117 $\quad$ $\lambda$pch := $\dfrac{2 \cdot T \cdot n \cdot \cos(\phi \text{pch})}{M - 1}$ $\quad$ $\lambda$pch = 0.63500043

$\lambda$lhpw := 2 · $\lambda$ − $\lambda$hpw $\quad$ $\lambda$lhpw = 0.634999883 $\quad$ $\lambda$lpch := 2 · $\lambda$ − $\lambda$pch $\quad$ $\lambda$lpch = 0.63499957

Hfppw := kZ · $\left(\dfrac{1}{\lambda} - \dfrac{1}{\lambda \text{hpw}}\right)$ $\quad$ Hfppw = 61.944 $\quad$ Hpch := kZ · $\left(\dfrac{1}{\lambda} - \dfrac{1}{\lambda \text{pch}}\right)$ $\quad$ Hpch = 228.753

I claim:

1. An optical apparatus for reading information from and writing information to a data storage device, comprising:
   a light source emitting a pencil of light rays to an optical path along an optical axis;
   a first interferometer;
   a second interferometer;
   a beamsplitter;
   a quarter wave plate; and
   an objective lens;
   wherein the pencil of light rays is transmitted respectively through the interferometer, the beamsplitter, the quarter-wave plate, and the objective lens to become constructive interference fringes of light upon reaching the data storage device.

2. The optical apparatus of claim 1, wherein the first and second interferometers are in optical alignment to the optical axis.

3. The optical apparatus of claim 1, wherein the first interferometer has a first interferometer optical axis intersecting the optical axis.

4. The optical apparatus of claim 3, wherein the second interferometer has a second interferometer optical axis intersecting the optical axis.

5. The optical apparatus of claim 4, wherein the data storage device is in a focal plane of the objective lens.

6. The optical apparatus of claim 1, wherein a plane defined by the first interferometer optical axis and the optical axis perpendicularly intersects a plane defined by the second interferometer optical axis and the optical axis.

7. The optical apparatus of claim 1, wherein the pencil of light rays is filtered by the first interferometer to produce a definable number of constructive interference fringe rings all sharing a center point and each ring has a unique radius as measured from the center point.

8. The optical apparatus of claim 7, wherein the pencil of light rays that are filtered by the first interferometer and the second interferometer becomes a sector as manifested on a focal plane of the objective lens.

9. The optical apparatus of claim 1, wherein one of or both of the first and second interferometers are Fabry-Perot interferometers.

10. The optical apparatus of claim 9, wherein one of or both of the first and second Fabry-Perot interferometers are electro-optical devices containing a medium that exhibits one of a Kerr effect and a Pockel effect.

11. The optical apparatus of claim 1, wherein one of or both of the first and second interferometers are Lummer-Gehrcke interferometers.

12. The optical apparatus of claim 11, wherein one of or both of the Lummer-Gehrcke interferometers are electro-optical devices containing a medium that exhibits one of a Kerr effect and a Pockel effect.

13. The optical apparatus of claim 1, wherein one of or both of the first and second interferometers are interference filters.

14. The optical apparatus of claim 13, wherein one of or both of the first and second interference filters are electro-optical devices containing a medium that exhibits one of a Kerr effect and a Pockel effect.

15. The optical apparatus of claim 1, wherein one of or both of the first and second interferometers are frustrated total interference filters.

16. The optical apparatus of claim 15, wherein one of or both of the first and second frustrated total interference filters are electro-optical devices containing a medium that exhibits one of a Kerr effect and a Pockel effect.

17. The optical apparatus for reading information from and writing information to a data storage device, comprising:

a light source surrounded by a coil generating either an electric field or a magnetic field and emitting a pencil of light rays to an optical path along an optical axis;

a first interferometer;

a second interferometer; and an objective lens;

wherein the pencil of light rays is transmitted respectively through the first and second interferometer and objective lens to become constructive interference fringes of light upon reaching said field-controlled location on a focal plane of the objective lens.

18. The optical apparatus of claim 17, wherein the first and second interferometers are in the optical path.

19. The optical apparatus of claim 17, wherein the first interferometer has a first interferometer optical axis intersecting the optical axis.

20. The optical apparatus of claim 17, wherein the second interferometer has a second interferometer optical axis intersecting the optical axis.

21. The optical apparatus of claim 17, wherein a plane defined by the first interferometer optical axis and the optical axis perpendicularly intersects a plane defined by the second interferometer optical axis and the optical axis.

22. The optical apparatus of claim 17, wherein the pencil of light rays is filtered by the first interferometer to produce a definable number of constructive interference fringe rings all sharing a center point and each ring has a unique radius as measured from the center point.

23. The optical apparatus of claim 22, wherein the pencil of light rays filtered by the first interferometer and the second interferometer becomes a sector as manifested on a focal plane of the objective lens.

24. The optical apparatus of claim 17, wherein one of or both of the first and second interferometers are Fabry-Perot interferometers.

25. The optical apparatus of claim 24, wherein one of or both of the first and second Fabry-Perot interferometers are electro-optical devices containing a medium that exhibits one of a Kerr effect and a Pockel effect.

26. The optical apparatus of claim 17, wherein one of or both of the first and second interferometers are Lummer-Gehrcke interferometers.

27. The optical apparatus of claim 26, wherein one of or both of the Lummer-Gehrcke interferometers are electro-optical devices containing a medium that exhibits one of a Kerr effect and a Pockel effect.

28. The optical apparatus of claim 17, wherein one of or both of the first and second interferometers are interference filters.

29. The optical apparatus of claim 28, wherein one of or both of the first and second interference filters are electro-optical devices containing a medium that exhibits one of a Kerr effect and a Pockel effect.

30. The optical apparatus of claim 17, wherein one of or both of the first and second interferometers are frustrated total interference filters.

31. The optical apparatus of claim 30, wherein one of or both of the first and second frustrated total interference filters are electro-optical devices containing a medium that exhibits one of a Kerr effect and a Pockel effect.

* * * * *

UNITED STATES PATENT AND TRADEMARK OFFICE
CERTIFICATE OF CORRECTION

PATENT NO. : 6,366,547 B1      Page 1 of 1
DATED : April 2, 2002
INVENTOR(S) : Roland H. Chase It is certified that error appears in the above-identified patent and that said Letters Patent is hereby corrected as shown below:

<u>Title page,</u>
Item [73] add -- Richard S. Scully, Banner Elk, NC --

Signed and Sealed this

Twenty-eighth Day of May, 2002

Attest:

JAMES E. ROGAN
*Attesting Officer*     *Director of the United States Patent and Trademark Office*